Patented Oct. 30, 1951

2,572,844

UNITED STATES PATENT OFFICE 2,572,844

POLYMERS FROM A COMPOSITION CONSISTING OF A PLURALITY OF AMINO ACID N-CARBOANHYDRIDES

Robert Neal MacDonald, New Castle, Del., assignor to E. I. du Pont de Nemours & Company, Wilmington, Del., a corporation of Delaware No Drawing. Application August 5, 1947, Serial No. 766,457

7 Claims. (Cl. 260—77.5)

This invention relates to polyamides, and more particularly to certain organic-soluble polymers obtained from polyamide-forming compositions containing N-carboanhydrides of a plurality of short-chain amino acids.

This invention has as an object the preparation of organic-solvent-soluble, high molecular weight, alpha-amino acid polymers of high softening point and capable of being shaped. Other objects will appear hereinafter.

These objects are accomplished by the condensation, with carbon dioxide evolution, of reactants consisting essentially of the N-carboanhydrides of a plurality of amino acids which amino acids have a radical length of 3 and have at most but one hydrogen on carbon alpha to the carboxyl, each of said N-carboanhydrides being an alpha-amino acid N-carboanhydride, and each N-carboanhydride being present to the extent of at least 10% of the N-carboanhydrides present. These polyamindes have a degree of polymerization (DP) of at least 25, i. e., a minimum of 25 amino acid units, do not soften below 125° C., and, in contrast to most known homopolymers of these amino acids, are soluble in a wide range of organic solvents, including m-cresol and chloroform, in one or both of which they are soluble to the extent of at least 0.5% at 25° C. By "softening point" is meant that point at which the polyamide starts to flow when dropped in finely powdered form on a clean copper Maquenne block. This test is made by heating the Maquenne block in such manner that its temperature rises at the rate of 1° C. per minute, dropping the powdered polymer on the block at intervals of no less than 1 minute, cleaning polymer from the block after each such addition, and continuing until the softening point is reached. Such point is recognized by a mark left on the surface of the block when the polymer particles are moved. The term "radical length" as here used refers to the number of atoms between and inclusive of the amino nitrogen and acyl carbon atoms. The term "intrinsic viscosity" has its conventional meaning as given in Advances in Colloid Science, vol. II, page 209.

The N-carboanhydrides employed in this invention may be prepared by the general method of Leuchs, Ber. 39, 857–861 (1906). For ease of handling and greater efficiency of reaction, the N-carbobenzyloxy derivative of the amino acid is preferred. Thus, the N-carboanhydride of alpha-aminoisobutyric acid, which has the formula

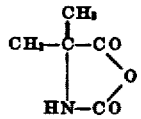

may be obtained as follows (parts given are by weight):

Thirty-seven (37) parts of N-(carbobenzyloxy)-alpha-amino-isobutyric acid [Bergmann et al., J. Biol. Chem. 109, 339–340 (1935)] and 126 parts of freshly distilled thionyl chloride are placed in a 500 cc. flask equipped with a reflux condenser protected from atmospheric moisture with a drier tube. This reaction mixture is allowed to stand overnight at room temperature and the excess thionyl chloride then removed under reduced pressure. The crystalline sludge which remains is transferred with petroleum ether to a Buchner funnel under anhydrous oxygen-free conditions and is rinsed repeatedly with cold petroleum ether after which it is recrystallized from a mixture of 30 parts ether and 70 parts petroleum ether, filtered, and dried in a vacuum desiccator. Yield, 12.2 parts or 64% of theory; melting point, 94–95° C.; chlorides present, none. Analysis—Calculated: N, 10.84. Found: N, 10.37, 10.57.

The following examples, in which the parts given are by weight, illustrate the practice of this invention.

EXAMPLE I

Copolymer from the N-carboanhydrides of alpha-aminoisobutyric acid and 1-aminocyclohexanecarboxylic acid A mixture of two parts of the N-carboanhydride of alpha-aminoisobutyric acid and one part of the N-carboanhydride of 1-aminocyclohexanecarboxylic acid was heated under nitrogen to 160° C. in an open glass or glass-lined vessel. A clear melt was obtained almost at once. Within two minutes vigorous evolution of carbon dioxide set in; within 25 minutes the liquid became so viscous that it began to foam, and after 3½ hours it became solid. Heating was continued for a total time of 4½ hours. The polymer so obtained was a white, amorphous powder which was infusible and darkened only in spots after one minute at 400° C. It had a nitrogen content of 14.65%, as compared with the calculated value of 14.55%, and an intrinsic viscosity of 0.13. This polymer gave a positive biuret test of lavender tint and was soluble in chloroform, chloral hydrate, m-cresol, phenol, and benzyl alcohol whereas polymers from the individual N-carboanhydrides are insoluble. It was swollen by benzene and cyclohexane, and was insoluble in tertiary butanol, concentrated hydrochloric acid, 98% formic acid, and water. End-group titrations (Waltz and Taylor, Anal. Chem. 19, No. 7, page 448) indicated an amino content of $330 \times 10^{-6}$ per gram of polymer. This indicated a molecular weight of about 3000 and a degree of polymerization (DP) of 27. Infra-red absorption diagrams showed the absence of diketopiperazine-type structures.

The addition of 0.066%, based on the N-carboanhydrides present, of either adipic acid or tetramethylenediamine, gave complete reactions within 20 and 40 minutes, respectively, as contrasted with 3½ hours without such initiator.

EXAMPLE II

*Polyamide from the N-carboanhydrides of alpha-aminoisobutyric acid and dl-beta-phenylalanine*

A mixture of equal parts of the N-carboanhydrides of dl-beta-phenylalanine and alpha-aminoisobutyric acid was heated under nitrogen at 146° C. The clear melt vigorously evolved carbon dioxide at once, foamed extensively and thickened after ten minutes, becoming solid after 35 minutes. Heating was continued for a total time of 80 minutes. The white, powdery polymer thus obtained was soluble in m-cresol at 25° C. and softened at 225° C. It was also soluble in phenol, cyclohexanone, and chloroform.

EXAMPLE III

*Polyamide from the N-carboanhydrides of dl-2-amino-4,6,6-trimethylheptanoic acid and 1-leucine*

A mixture of equal parts of the N-carboanhydrides of dl-2-amino-4,6,6-trimethylheptanoic acid and 1-leucine was heated under nitrogen at 146° C. Evolution of carbon dioxide occurred at once but ceased for the most part after ten minutes. Heating was continued for a total of 30 minutes. The white, powdery polymer thus obtained softened at 225° C. and was soluble in benzene, chloroform, and 1-amyl bromide. A clear, tough, pliable film was cast from the benzene solution. A strip of this film was cold drawn, indicating it to be orientable.

EXAMPLE IV

*Polyamide from the N-carboanhydrides of dl-beta - phenylalanine, alpha - aminoisobutyric acid, and 1-aminocyclohexanecarboxylic acid*

A mixture of equal parts of the N-carboanhydrides of dl-beta-phenylalanine, alpha-aminoisobutyric acid, and 1-aminocyclohexanecarboxylic acid was heated under nitrogen at 145° C. Vigorous evolution of carbon dioxide occurred at once in the clear melt. Extensive foaming set in, the melt thickened and within 35 minutes became solid. Heating was continued for a total time of 80 minutes. The resulting white, powdery polymer softened at 180° C. and was soluble in m-cresol, phenol, cyclohexanone, and chloroform.

These polyamides may be prepared, optionally in the presence of organic liquids (e. g., nitromethane, cyclohexanol, glycol diacetate, dimethylformamide, tert-butanol, or glycol diethyl ether), by the condensation polymerization (thermal or initiated by water, ethanol, phenols, organic acids, or amino-hydrogen-containing amines) of the amino acid N-carboanhydrides, with carbon dioxide evolution. The preferred procedure is to heat the selected amino acid N-carboanhydride-containing composition under oxygen-free conditions, in a vessel adapted to permit escape of carbon dioxide, to that temperature at which carbon dioxide begins to be evolved at an appreciable rate. This varies somewhat with different compounds but is usually in the neighborhood of 140-200° C., and is generally above the melting point of the amino acid N-carboanhydride. Heating is continued until carbon dioxide evolution ceases, with the temperature maintained at the gas evolution point or slightly above it. The time of the reaction may be shortened, or the temperature necessary may be lowered, or both may be accomplished, by the use of reaction initiators, e. g., water, alcohols, phenols, organic acids such as adipic acid, or amino-hydrogen-containing amines such as tetramethylenediamine.

The products of this invention are prepared from reaction mixtures wherein the reactants consist essentially of the N-carboanhydrides of several, that is, two or more, amino-hydrogen-containing monoaminomonocarboxylic acids of radical length 3 and having at most only one alpha hydrogen atom, the alpha-amino acid N-carboanhydrides forming 100% by weight of the N-carboanhydrides present, and each N-carboanhydride being present in the mixture to the extent of at least 10% thereof. Preferred for reasons of increased thermal stability are mixtures of N-carboanhydrides of such alpha-amino acids, wherein at least one, and preferably each one, of the N-carboanhydrides present has a hydrogen-free alpha-carbon atom, more particularly an alpha-carbon whose non-annular valences are satisfied only by carbon. Especially preferred, because of the increased softening point and stiffness of the resulting polymers, are such mixtures wherein at least one, and preferably each one, of the N-carboanhydrides present has an alpha-carbon atom which is "symmetrically" and "lightly" substituted, that is, one which is externally attached to two identical alkyl groups of no more than four carbon atoms each, or one which is a spiro atom, that is, a carbon atom common to the carboanhydride ring and to another ring (such other ring preferably being carbocyclic and preferably having no more than 7 members), as in the N-carboanhydride of 1-aminocyclohexanecarboxylic acid. Polymers prepared from compositions containing such spiro N-carboanhydrides are disclosed and claimed in my copending application Serial No. 766,458, filed herewith. By "alpha-carbon atom" is meant, of course, the carbon atom between the nitrogen and the acyl carbon atoms. Similarly, by "alpha-hydrogen" is meant hydrogen attached to alpha-carbon.

Other specific N-carboanhydrides, mixtures of which may be polymerized according to this invention and any two or more of which may be used, include those of amino acids such as valine, alanine, norleucine, isoleucine, tryptophane, methionine, tryosine, cystine, lysine, histidine, and glutamic acid.

The polyamides of this invention may be used to produce films and fibers. They may also be molded. These polyamides are soluble in one or more of the following: sulfuric acid; 5 and 6 membered alicyclic ketones which are liquid below 75° C., e. g., cyclopentanone and cyclohexanone; halogenated hydrocarbons, liquid below 75° C., e. g., methylene chloride, chloroform, carbon tetrachloride, 1,2-dichloroethane, allyl iodide, benzyl chloride, and chlorobenzene; and phenols and thiophenols liquid below 75° C. such as phenol, chlorophenol, m-cresol, thiophenol, resorcinol monomethylether. In general, they are soluble in chloroform and/or m-cresol to the extent of at least 0.5% at 25° C.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A product of the condensation, with carbon dioxide evolution, of a composition consisting of N-carboanhydrides of a plurality of alpha-amino acids which acids are free from hydrogen on carbon alpha to carboxyl, each N-carboanhydride being present to the extent of at least 10%, by weight, of the reaction mixture, said product having a solubility in one of the solvents of the class consisting of m-cresol and chloroform, to the extent of at least 0.5% at 25°% C., a degree of polymerization of at least 25, and a softening point not below 125° C.

2. A product of the condensation, with carbon dioxide evolution, of a composition consisting of N-carboanhydrides of a plurality of alpha-amino acids having at most one hydrogen on carbon alpha to carboxyl, each N-carboanhydride being present to the extent of at least 10%, by weight, of the reaction mixture, said product having a solubility in one of the solvents of the class consisting of m-cresol and chloroform, to the extent of at least 0.5 at 25° C., a degree of polymerization of at least 25, and a softening point not below 125° C.

3. A product of the condensation, with carbon dioxide evolution, of a composition consisting of N-carboanhydrides of a plurality of alpha-amino acids wherein each N-carboanhydride is present to the extent of at least 10%, by weight, of the reaction mixture and has the valences of its alpha carbon atom satisfied only by carbon and the one amino nitrogen, said product having a solubility in one of the solvents of the class consisting of m-cresol and chloroform, to the extent of at least 0.5% at 25° C., a degree of polymerization of at least 25, and a softening point not below 125° C.

4. A linear polymeric product of the condensation, with carbon dioxide evolution, of a composition consisting of the N-carboanhydrides of a plurality of alpha amino acids each of which has at most one hydrogen on the alpha carbon, contains only carbon, hydrogen, the two carboxyl oxygens, and the one amino nitrogen, has hydrogen on the amino nitrogen, is free from aliphatic unsaturation, each N-carboanhydride being present to the extent of at least 10%, by weight, of the reaction mixture, said product having a solubility in one of the solvents of the class consisting of m-cresol and chloroform, to the extent of at least 0.5% at 25° C., a degree of polymerization of at least 25, and a softening point not below 125° C.

5. A linear polymeric product of the condensation, with carbon dioxide evolution, of a composition consisting of the N-carboanhydrides of a plurality of alpha amino acids each of which is free from hydrogen on the alpha carbon, contains only carbon, hydrogen, the two carboxyl oxygens, and the one amino nitrogen, has hydrogen on the amino nitrogen, is free from aliphatic unsaturation, each N-carboanhydride being present to the extent of at least 10%, by weight, of the reaction mixture, said product having a solubility in one of the solvents of the class consisting of m-cresol and chloroform, to the extent of at least 0.5% at 25° C., a degree of polymerization of at least 25, and a softening point not below 125° C.

6. A product of the condensation, with carbon dioxide evolution, of a composition consisting of N-carboanhydrides of a plurality of alpha-amino acids having at most one hydrogen on carbon alpha to carboxyl, one of said acids being alpha-aminoisobutyric acid, each N-carboanhydride being present to the extent of at least 10%, by weight, of the reaction mixture, said product having a solubility in one of the solvents of the class consisting of m-cresol and chloroform, to the extent of at least 0.5% at 25° C., a degree of polymerization of at least 25, and a softening point not below 125° C.

7. A product of the condensation, with carbon dioxide evolution, of a composition consisting of the N-carboanhydrides of alpha-aminoisobutyric acid and dl-beta-phenylalanine, each N-carboanhydride being present to the extent of at least 10%, by weight, of the reaction mixture, said product being soluble in chloroform and m-cresol to the extent of at least 0.5% at 25° C., of a degree of polymerization of at least 25, and of a softening point not below 125° C.

ROBERT NEAL MACDONALD.

REFERENCES CITED

The following references are of record in the file of this patent:

UNITED STATES PATENTS

| Number | Name | Date |
|---|---|---|
| 2,007,633 | Bornhauser | July 9, 1935 |
| 2,327,162 | Baldwin et al. | Aug. 17, 1943 |

FOREIGN PATENTS

| Number | Country | Date |
|---|---|---|
| 555,129 | Great Britain | Aug. 5, 1943 |

OTHER REFERENCES

Sahyun: Outline of the Amino Acids and Proteins, 1944, page 67.

Office of Technical Services, PB34,279, Dec. 13, 1946, 3 pp.

Woodward et al.: Jour. Am. Chem. Soc., vol. 69, pp. 1551-2, June 1947.

Leuchs et al.: Deu. Chem. Gesel. Ber., vol. 41, pp. 1721-26 (1908).

Curtius et al.: Deu. Chem. Gesel. Ber., vol. 55, pages 1543-1558 (1922).

Fischer: Berichte Deutsche Chem. Gesel., vol. 40, 1907, pp. 1754, 1755.

Go et al.: Bull. Chem. Soc. of Japan, 1939, pp. 510 to 516.

Certificate of Correction

Patent No. 2,572,844                                                    October 30, 1951

ROBERT NEAL MacDONALD

It is hereby certified that error appears in the printed specification of the above numbered patent requiring correction as follows:

Column 3, line 64, for "145° C." read *146° C.*; column 5, line 29, for "25°% C." read *25° C.*; line 41, for "0.5" read *0.5%*;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*